UNITED STATES PATENT OFFICE.

ERNST KÖNIG AND FRANZ SCHOLL, OF HÖCHST-ON-THE-MAIN, GERMANY, ASSIGNORS TO THE FARBWERKE, VORMALS MEISTER, LUCIUS & BRÜNING, OF SAME PLACE.

AROMATIC AMIDOAMMONIUM BASE AND PROCESS OF MAKING SAME.

SPECIFICATION forming part of Letters Patent No. 618,688, dated January 31, 1899.

Application filed April 22, 1897. Serial No. 633,380. (Specimens.)

*To all whom it may concern:*

Be it known that we, ERNST KÖNIG and FRANZ SCHOLL, doctors of philosophy, citizens of the Empire of Germany, residing at Höchst-on-the-Main, Germany, have invented certain new and useful Improvements in the Manufacture of Aromatic Amidoammonium Bases, (for which we have obtained Letters Patent in Great Britain, No. 14,494, dated July 30, 1895, and in France, No. 249,227, dated July 27, 1895,) of which the following is a specification.

We have found that aromatic amidoammonium bases of the general formula:

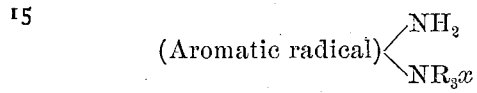

valuable for the production of azo dyestuffs, may be obtained by reducing the corresponding nitro-ammonium bases with metals, such as zinc or iron, in acid or neutral solutions. In the formula, $x$ represents chlorin or the equivalent radical of an acid.

We may illustrate our method by the following examples:

First. Two kilograms of meta-nitrophenyl-trimethyl-ammonium chlorid are mixed with five liters of water and five kilos of hydrochloric acid, and two kilograms of zinc powder are gradually introduced into the mixture. The reaction takes place very readily with great generation of heat.

Second. Twenty kilograms of iron chips are stirred with two hundred liters of water and ten kilograms of common salt, to which are added gradually when the boiling-point is nearly reached twenty-five kilograms of nitrophenyltrimethylammonium chlorid. As soon as the nitro compound has disappeared the solution containing the amido-ammonium base is filtered off from the iron slime. After sufficient concentration the salt of meta-amidophenyl-trimethyl-ammonium base separates from the solution. The salt thus obtained forms colorless crystals and is easily soluble both in cold and in hot water, less soluble in alcohol, and insoluble in benzene or petroleum. It decomposes when heated. The salt of the amido-ammonium bases gives when diazotized a stable diazo compound which combines with amins and phenols to basic azo dyestuffs soluble in water.

Having thus described our invention, what we claim is—

1. The process herein described of producing aromatic amido-ammonium bases of the general formula:

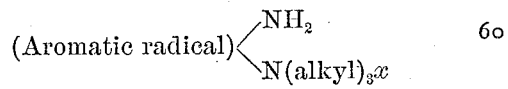

in the form of their salts, which consists in reducing aromatic nitro-ammonium bases with metals, in an acid or neutral solution, substantially as set forth.

2. As a new article of manufacture, meta-amidophenyltrimethylammonium base, being in the form of its salts, a colorless substance which is easily soluble in water, less soluble in alcohol, insoluble in benzene or petroleum, decomposes when heated, and combines when diazotized, with amins and phenols to basic azo dyestuffs soluble in water, substantially as set forth.

In testimony that we claim the foregoing as our invention we have signed our names in presence of two subscribing witnesses.

ERNST KÖNIG.
FRANZ SCHOLL.

Witnesses:
HEINRICH HAHN,
ALFRED B. EISBOIS.